US012643494B2

(12) United States Patent
Cho et al.

(10) Patent No.: US 12,643,494 B2
(45) Date of Patent: Jun. 2, 2026

(54) HIGH VOLTAGE CONNECTOR FOR VEHICLE

(71) Applicants:Hyundai Motor Company, Seoul (KR); Kia Corporation, Seoul (KR)

(72) Inventors: Won Cheol Cho, Seoul (KR); Chan Woo Jeong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 384 days.

(21) Appl. No.: 18/217,856

(22) Filed: Jul. 3, 2023

(65) Prior Publication Data

US 2024/0123924 A1 Apr. 18, 2024

(30) Foreign Application Priority Data

Oct. 13, 2022 (KR) ........................ 10-2022-0131755

(51) Int. Cl.
| | |
|---|---|
| B60R 13/02 | (2006.01) |
| B60R 16/023 | (2006.01) |
| H01R 13/53 | (2006.01) |
| H01R 13/639 | (2006.01) |

(52) U.S. Cl.
CPC ........... B60R 16/023 (2013.01); H01R 13/53 (2013.01); H01R 13/639 (2013.01); H01R 2201/26 (2013.01)

(58) Field of Classification Search
None
See application file for complete search history.

(56) References Cited

U.S. PATENT DOCUMENTS

| | | | | |
|---|---|---|---|---|
| 377,237 | A * | 1/1888 | Cole | |
| 2,337,618 | A * | 12/1943 | Miller | H01R 13/621 |
| | | | | 174/21 JS |
| 2,988,723 | A * | 6/1961 | Archer | H01R 13/53 |
| | | | | 439/161 |
| 3,193,895 | A * | 7/1965 | Oxley | H01R 13/41 |
| | | | | 24/297 |
| 3,372,476 | A * | 3/1968 | Peiffer | H01R 13/20 |
| | | | | 228/253 |
| 4,405,196 | A * | 9/1983 | Fulton | H01R 13/20 |
| | | | | 439/724 |
| 4,878,863 | A * | 11/1989 | Swengel Jr. | H01R 13/187 |
| | | | | 439/884 |
| 5,482,480 | A * | 1/1996 | Miyazaki | H01R 13/193 |
| | | | | 439/825 |

(Continued)

FOREIGN PATENT DOCUMENTS

KR 20160055521 A 5/2016

*Primary Examiner* — Neil Abrams
(74) *Attorney, Agent, or Firm* — Banner & Witcoff, Ltd.

(57) ABSTRACT

A high voltage connector for a vehicle may include a male connector having a truncated conical protuberance-shaped first terminal, and a female connector having a second terminal provided with a truncated conical coupling groove corresponding to the first terminal, wherein an electrical connection between the male connector and the female connector is accomplished as the first terminal is inserted into the coupling groove of the second terminal. When the first terminal and the second terminal are coupled to each other, elastic deformation may be induced which may provide a holding force between the first and second terminals using elastic stress, resulting in improved stability of a high voltage power supply.

10 Claims, 4 Drawing Sheets

(56) References Cited

U.S. PATENT DOCUMENTS

| | | | | |
|---|---|---|---|---|
| 5,662,489 A * | 9/1997 | Stirling | .................. | H01R 24/40 |
| | | | | 439/339 |
| 5,713,765 A * | 2/1998 | Nugent | .............. | H01R 13/2421 |
| | | | | 439/884 |
| 6,171,121 B1 * | 1/2001 | Krappel | ................... | H01R 4/50 |
| | | | | 439/158 |
| 10,431,919 B2 * | 10/2019 | Markgraf | ............. | H01R 13/052 |

* cited by examiner

HIGH VOLTAGE CONNECTOR FOR VEHICLE

CROSS REFERENCE TO RELATED APPLICATION

The present application claims priority to Korean Patent Application No. 10-2022-0131755, filed on Oct. 13, 2022, the entire contents of which is incorporated herein for all purposes by this reference.

FIELD

The present disclosure relates to a high voltage connector for a vehicle and, more particularly, to a high voltage connector, for a vehicle, that strengthens a fastening force between a male connector and a female connector, which may improve the stability of a high voltage power supply.

BACKGROUND

As the prevalence of eco-friendly vehicles is spreading, a demand for high-voltage parts with high power consumption is also increasing.

Accordingly, there is a need for high voltage connectors and high-voltage cables of various standards for stable power transmission between high-voltage batteries, driving motors, and hydrogen fuel cells in Battery Electric Vehicle (BEV) or Fuel Cell Electric Vehicle (FCEV) vehicles.

A high voltage connector may be used to electrically connect high voltage cables, and may have a male connector and a female connector.

The male connector and the female connector may be coupled by inserting the male connector into the female connector. When the male connector and the female connector are coupled together, terminals provided inside the connectors may be electrically connected to each other.

When a high voltage connector is used to connect high voltage parts to each other, e.g., in vehicle operating conditions, the high voltage connector may be used to transmit supplies voltage signals of a certain magnitude (e.g., 30V AC or DC or 60V AC or DC or higher). A high voltage connector that can stably transmit high voltage power under the vehicle operating conditions may be desired.

Vehicle operating conditions generally include vibration, acceleration, deceleration, and/or collision situations. In order to enable stable transmission of high voltage power under such situations, a robust coupling structure different from that of a low voltage connector, may be needed. One way to achieve such a robust coupling structure is to couple the high voltage connector with bolts.

However, a high voltage cable may be heavy and therefore greatly affected by inertia such that a vibration (e.g., of a vehicle) transferred to the high voltage cable would be eventually transferred to a terminal of the high voltage connector, which may cause performance degradation due to heat and unstable connection.

When the vibration is transferred to the terminal of the high voltage connector through the high voltage cable, vibration at a terminal contact area may decrease the contact area intermittently, contact resistance may increase due to the decrease of the contact area, and heat may be generated. Due to the heat generation, electrical conductivity of a conductor (e.g., of the terminal) is reduced, resulting in overheating which causes performance degradation.

If bolts or other similar fasteners are used to maintain connection between terminals so as to avoid the problems above, vibrations in a different direction from a coupling direction of the bolts may loosen the bolts. Thus, a bolted or otherwise similarly fastened connector is still vulnerable to vibration.

If a spring is used to apply an elastic force to a terminal part of the high voltage connector to maintain the connection between the terminals, due to structural limitations, the spring may lack or lose elasticity to absorb a kinetic energy of the heavy high voltage cable. Thus, a connector with a spring force applied to the terminals may still experience performance degradation as described above.

The vibration of the high voltage cable may be reduced by securing the high voltage cable (e.g., to the vehicle) at regular distances. However, securing the cable requires a plurality of additional parts and additional work and assembly of securing the cable (e.g., to the vehicle), which may be difficult due to a shape of the securing part and/or a design of the vehicle.

The foregoing description is intended merely to aid in the understanding of the background of the present disclosure, and is not intended to mean that the present disclosure falls within the purview of the related art that is already known to those skilled in the art.

SUMMARY

The following summary presents a simplified summary of certain features. The summary is not an extensive overview and is not intended to identify key or critical elements.

Systems, apparatuses, and methods are described for a high voltage connector. A high voltage connector may comprise a male connector having a truncated conical protuberance-shaped first terminal; and a female connector having a second terminal that forms a truncated conical coupling groove corresponding to the first terminal. The first terminal may be configured to form an electrical connection between the male connector and the female connector when inserted into the coupling groove.

These and other features and advantages are described in greater detail below.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
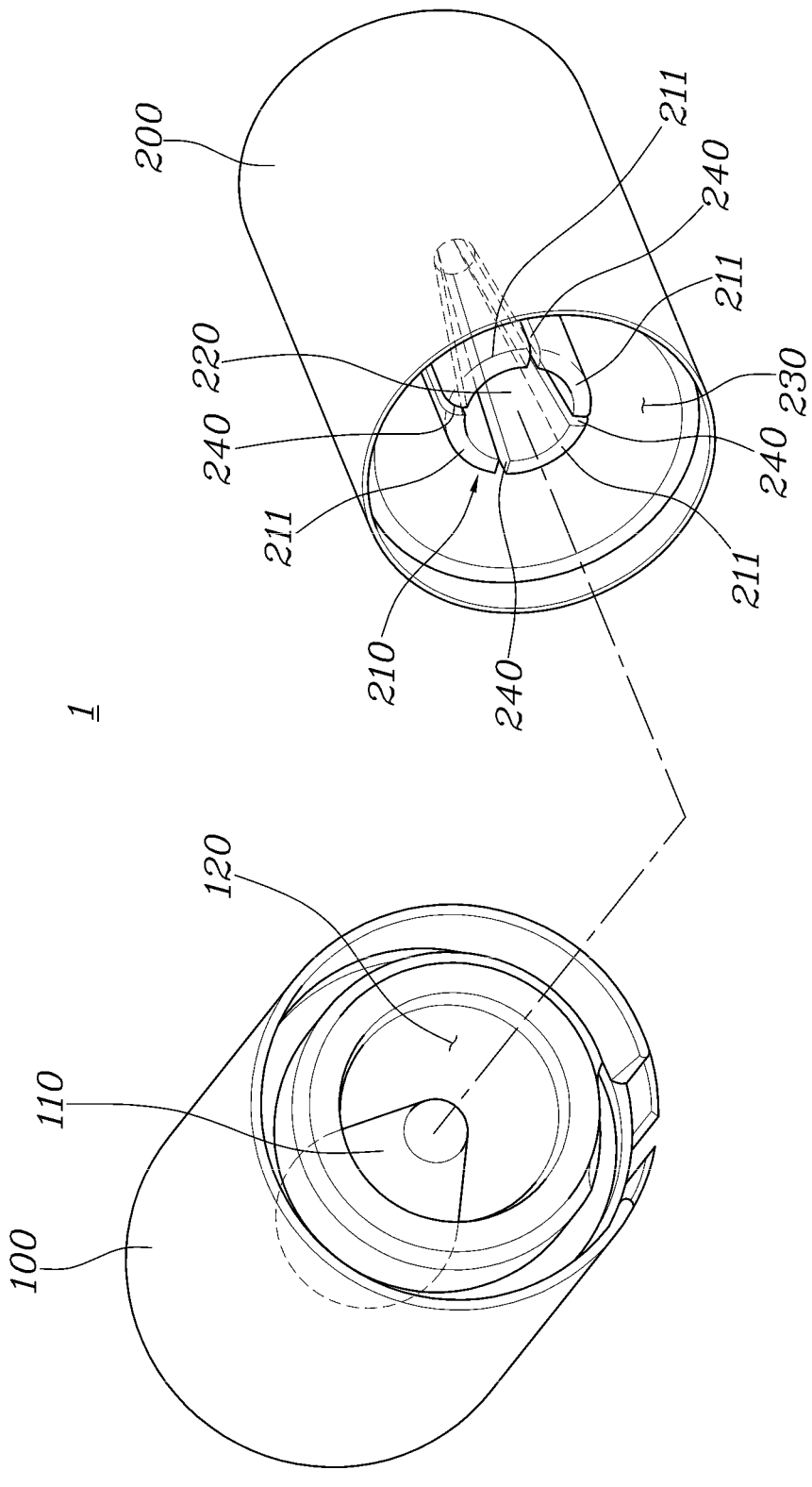
FIG. 1 is an exploded perspective view of a male connector and a female connector of a high voltage connector according to the present disclosure.

Hereinbelow, examples will be described in detail with reference to accompanying drawings. The same reference numerals will refer to the same or like parts, and redundant descriptions thereof will be omitted.

The suffixes "module" and "part" used for the components in the following description are used only for the ease of writing the specification, and do not have distinct meanings or roles by themselves.

In the following description, if a detailed description of known function, element, or configuration would make the subject matter of the disclosure unclear, the detailed description is omitted. Furthermore, the accompanying drawings are only for understanding of certain examples of the present disclosure, and the technical ideas disclosed in the specification are not limited by the accompanying drawings. Those skilled in the art will appreciate that various modifications, additions and substitutions are possible, without departing from the scope and spirit of the disclosure and the subject matter in the accompanying claims.

It will be understood that, although the terms "first" and/or "second," etc., are used herein to describe various elements, these elements should not be limited by these terms. These terms are only used to distinguish one element from another element.

It is to be understood that when one element is referred to as being "connected to" or "coupled to" another element, it may be connected directly to or coupled directly to another element or be connected to or coupled to another element having still another element intervening therebetween. On the other hand, it is to be understood that when one element is referred to as being "connected directly to" or "coupled directly to" another element, it is connected to or coupled to the another element without any other element intervening therebetween.

Singular forms are intended to include plural forms unless the context clearly indicates otherwise.

It will be further understood that the terms "comprise," "have," "include," or variations thereof used in this specification, specify the presence of stated features, steps, operations, components, parts, or a combination thereof, but do not preclude the presence or addition of one or more other features, numerals, steps, operations, components, parts, or a combination thereof.

Furthermore, a unit or a control unit included in names such as a motor control unit (MCU), a hybrid control unit (HCU), etc., is a widely used term for a controller that controls a specific function of a vehicle, and does not mean a generic function unit.

The controller may include a communication device for communicating with other controllers, a sensor to control the function in charge, a memory storing an operation system and/or a logic command/instructions and/or input/output information, and at least one processor for performing determinations, calculations, and/or decisions necessary for controlling the function in charge.

Hereinbelow, a high voltage connector for a vehicle according to an example of the present disclosure will be described in detail with reference to the accompanying drawings.

Figure 2:
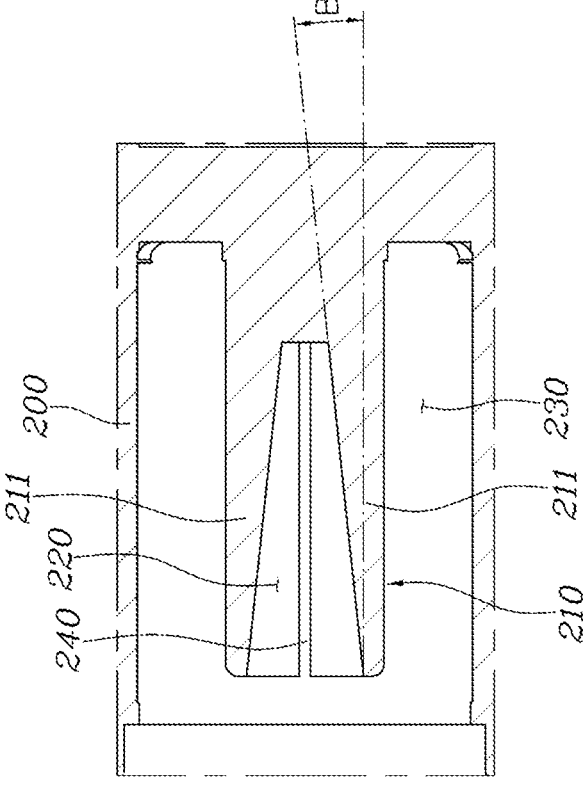
FIG. 2 is an axial cross-sectional view of FIG. 1.
Figure 2:
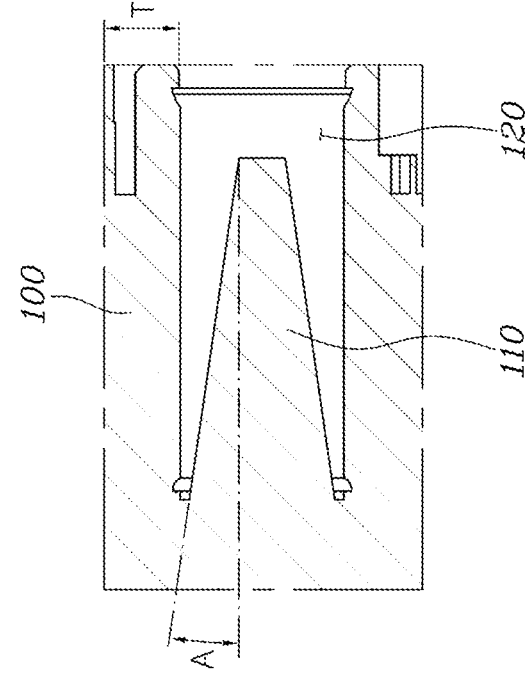
Figure 3:
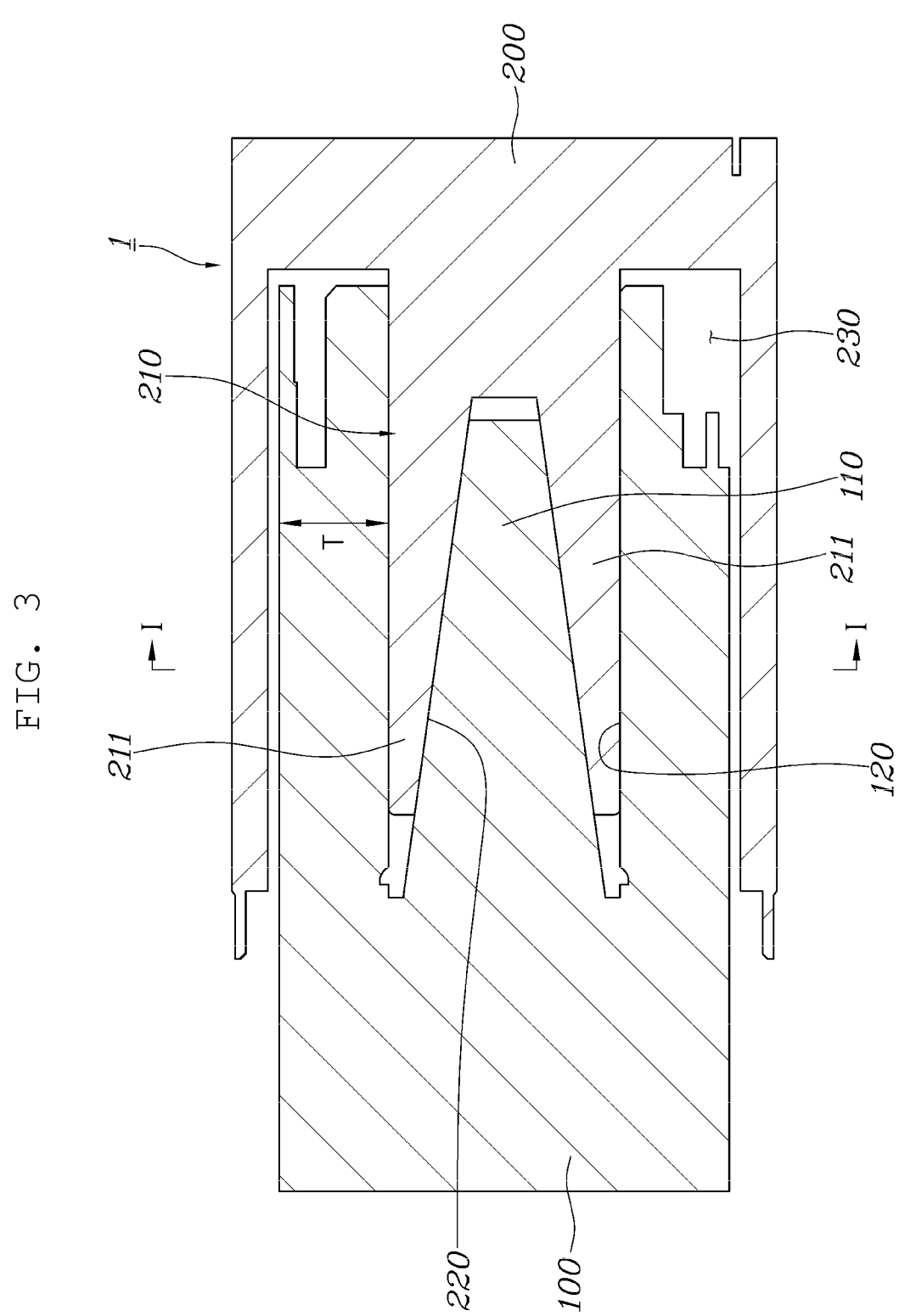
FIG. 3 is a combined view of FIG. 2.
Figure 4:
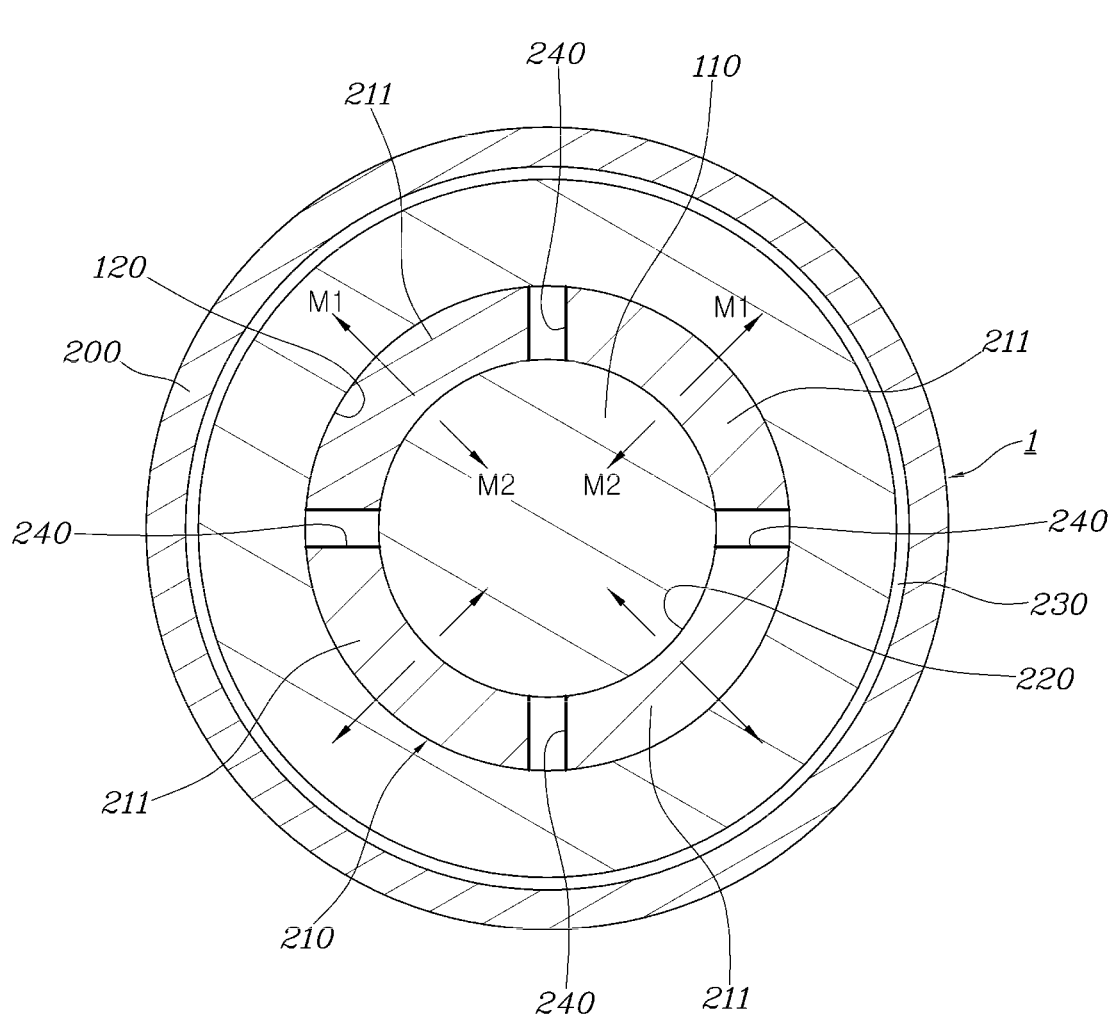
FIG. 4 is a cross-sectional view taken along line I-I of FIG. 3.

FIGS. 1 and 2 are views showing a state which a male connector and a female connector of a high voltage connector of the present disclosure are separate from each other. FIG. 3 is a combined view of the male connector and female connector of FIG. 2. FIG. 4 is a cross sectional view of the combined state of the male and female connectors shown in FIG. 3.

As shown in the drawings, the high voltage connector 1 (e.g., for a vehicle) according to the present disclosure includes a male connector 100 and a female connector 200, which may be assembled with each other in an inserting and coupling manner.

The high voltage connector 1 may be used to connect high voltage cables connected to each of the male connector 100 and the female connector 200.

A first terminal 110 having a protuberance shape (e.g., a truncated conical protuberance shape) may be provided in the male connector 100. A second terminal 210 (e.g., having a substantially cylindrical or otherwise radially symmetric external shape) may be provided in the female connector 200. A coupling groove 220 having a shape (e.g., a truncated conical shape) corresponding to the first terminal 110 may be provided in the second terminal 210.

Therefore, when the first terminal 110 (e.g., with the shape of the truncated conical protuberance) is inserted into the coupling groove 220 of the second terminal 210 and coupled thereto, the first terminal 110 and the second terminal 210 are electrically connected together, and thereby an electrical connection between the male connector 100 and the female connector 200 is accomplished.

A male connector groove 120, with a first end that is closed and a second end that is open and configured to accept the second terminal 210 of the female connector 200, may be provided in the male connector 100. The first terminal 110 may be configured to protrude from the closed first end of the male connector groove 120 toward the open second end.

Referring to FIG. 2, a left side of the male connector groove 120 has the closed first end and a right side thereof toward the female connector 200 has the open second end.

The first terminal 110 is configured to protrude from inside the male connector 100 toward the female connector 200 when connecting the male connector 100 and female connector 200. The first terminal 110 may have a largely cross-section that decreases along a protruding direction (e.g., gradually decreases in diameter in the case of a truncated conical protuberance).

Referring to FIG. 2, the first terminal 110 is configured in a shape of a truncated conical protuberance which protrudes in a protruding direction from the left side (e.g., closed first end) to the right side (e.g., open second end) toward the female connector 200. The diameter of the left side end of the first terminal 110 is larger than the diameter of the right side end, and the diameter decreases gradually in from the left side to the right side end.

Inside of the female connector 200, a female connector groove 230 having a first end closed and a second end open toward the male connector 100 is formed. The second terminal 210 is configured to protrude from the closed first end of the female connector groove 230 to the second open end.

Referring FIG. 2, the female connector groove 230 is configured to have a right side closed and a left side open toward the male connector 100.

The second terminal 210 is configured to protrude from the inside of the female connector 200 toward the male connector 100 (in FIG. 2 or when connecting the female connector 200 and the male connector 100), and the coupling groove 220 is configured to be open from the inside of the second terminal 210 toward the male connector 100 and increases gradually in diameter along an opening direction (e.g., right to left in FIG. 2).

Referring FIG. 2, the second terminal 210 is configured to protrude from the right side to the left side toward the male connector 100, and has a substantially cylindrical external shape. The coupling groove 220 is provided in the inside of the second terminal 210.

The coupling groove 220 extends along a longitudinal direction of the second terminal 210 (e.g., right to left in FIG. 2), and is configured to have a closed right side and an open left side that is open toward the male connector 100, and a diameter of the left side end is larger than a diameter of a right side end. The coupling groove 220 is configured in a shape corresponding to the first terminal 110 (e.g., a truncated conical which decreases gradually in diameter from the left side end to the right side end.

The first terminal 110 is configured to be inserted in the coupling groove 220 by having corresponding shapes (e.g., the truncated conical shaped protuberance of the first terminal 110 and the shape of the coupling groove 220 correspond to each other) so that the first terminal 110 may be inserted into the coupling groove 220.

In addition, when the male connector 100 and the female connector 200 are connected to each other, a thick part T of the male connector 100 is inserted into the female connector groove 230, and through this, a reduction in an overall length of the completed high voltage connector to the minimum may be accomplished by inserting some length of the male connector 100 into the female connector 200.

One or more slit holes 240 extending along a longitudinal direction of the second terminal 210 may be provided along the inside of the female connector 200 (e.g., along the inside surface of the female connector 200 forming the coupling groove 220. The one or more slit holes 240 may open toward the male connector 110, may be continuous with the coupling groove 220 inside the second terminal, and may be (in the case of a plurality of slit holes 240) spaced apart from each other along a circumferential direction of the second terminal 210. The second terminal 210 may be configured to be divided into a plurality of elastically deformable pieces 211 by the slit holes 240.

Referring to FIG. 1, four slit holes 240 are provided radially from a center of the coupling groove 220. Thus, the second terminal 210 is configured to be divided into four elastically deformable pieces 211.

Naturally, selecting a number of the slit holes 240 may result in a corresponding number of the elastically deformable pieces 211, which may be tuned in various ways through design changes.

The elastically deformable pieces 211 may be elastically deformed within an elastic limit point when an external force is applied thereto, and elastic stress is generated by the shape restoring force, and the elastic stress may be tuned to various values depending on a material and shape of the elastically deformable pieces 211.

According to an example of the present disclosure, an inclination angle A of an outer surface of the first terminal 110 is configured to be greater than an inclination angle B of an inner circumferential surface of the coupling groove 220.

Therefore, when the first terminal 110 is inserted into the coupling groove 220, the elastically deformable pieces 211 of the second terminal 210 may be elastically deformed to open outwardly (shown by the arrow M1 in FIG. 4), and an elastic stress for shape restoration may generated by elastic deformation (shown by the arrow M2 in FIG. 4) of the elastically deformable pieces 211. The elastically deformable pieces 211 of the second terminal 210 may press inwardly in response to the elastic stress and press the outer surface of the first terminal 110, thereby increasing the fastening force between the first terminal 110 and the second terminal 210. This fastening force may enhance stability of high voltage power supply by acting as a resistance to vibration and shock under an actual driving conditions of a vehicle.

As described above and in the example illustrated in FIGS. 1-4, in the high voltage connector 1, the first terminal 110 of the male connector 100 is configured as the truncated conical shaped protuberance and the truncated conical shaped coupling groove 220 is provided in the second terminal 210 of the female connector 200. The first terminal 110 may be inserted into the coupling groove 220 so as to connect the male connector 100 to the female connector 200 and connect the first terminal 110 to the second terminal 210. A slight difference in inclination angle may be formed between first terminal 110 and coupling groove 220, such that the first terminal 110 widens slightly faster than the coupling groove 220. This slight mismatch in inclination angle (and/or widening rate may induce elastic deformation at the coupling part of the first terminal 110 and the second terminal 210 (e.g., may induce elastic deformation of the elastically deformable pieces 211), and elastic stress generated from the elastic deformation may act as a fastening force between the first terminal 110 and second terminals 210 and as a resistance to external vibration, thereby enhancing stability of high voltage power supply.

In addition, an example according to the present disclosure does not use any separate fixing member, such as bolts and/or springs, to maintain the fastening force between the male connector 100 and the female connector 200, thereby reducing a number of parts, weight, costs.

The present disclosure is intended to provide a high voltage connector for a vehicle capable of enhancing stability of high voltage power supply, by making a terminal of a male connector and a terminal of a female connector to be a truncated conical protrusion and a groove, respectively, and coupling the terminals to each other by insertion therebetween, and inducing an elastic deformation at a coupling part of the terminals by forming a difference in inclination angle between the truncated conical shaped protrusion and the groove, and using elastic stress generated from the elastic deformation as a holding force between the terminals and a resistance to a vehicle vibration.

In order to achieve the objectives as described above, the present disclosure provides a high voltage connector including: a male connector having a truncated conical protuberance-shaped first terminal; and a female connector having a second terminal provided with a truncated conical coupling groove corresponding to the first terminal, wherein an electrical connection between the male connector and the female connector is accomplished as the first terminal is inserted into the coupling groove of the second terminal and connected thereto.

In an inside of the male connector, a male connector groove having a first end closed and a second end open toward the female connector may be provided; and the first terminal may be configured to protrude from the closed first end of the male connector groove toward the open second end.

The first terminal may be configured to protrude from inside the male connector toward the female connector and to decrease gradually in diameter along a protruding direction.

In an inside of the female connector, a female connector groove having a first end closed and a second end open toward the male connector may be provided; and the second terminal may be configured to protrude from the closed first end of the female connector groove toward the open second end.

The second terminal may be configured to protrude from inside the female connector toward the male connector; and the coupling groove may be configured to be open toward the male connector from inside the second terminal and to increase gradually in diameter along an open direction.

When the male connector and the female connector are coupled to each other, a thick part of the male connector may be inserted into the female connector groove.

In the second terminal, a plurality of slits extending along longitudinal directions of the second terminal, open toward the male connector, connected to the coupling groove inside the second terminal, and spaced apart from each other along a circumferential direction of the second terminal may be provided; and the second terminal may be configured to be divided into a plurality of elastically deformable pieces by the slits.

In the high voltage connector, an inclination angle A of an outer surface of the first terminal may be configured to be greater than an inclination angle B of an inner circumferential surface of the coupling groove.

When the first terminal is inserted into the coupling groove, the elastically deformable pieces of the second terminal may be elastically deformed to open outwardly, and elastic stress for shape restoration may be generated by elastic deformation, and the elastically deformable pieces of the second terminal may shrink inwardly by the elastic stress and may press the outer surface of the first terminal, thereby increasing a fastening force between the first terminal and the second terminal.

According to the present disclosure, in the high voltage connector, the first terminal of the male connector is configured as the truncated conical protuberance-shaped terminal and the conical coupling groove is formed at the second terminal of the female connector, and the terminals are coupled together by inserting the first terminal into the coupling groove, and a difference in an inclination angle is formed between the truncated conical shaped first terminal and the coupling groove, thereby inducing an elastic deformation at a coupling part of the first terminal and the second terminal, and producing a fastening force between the first and second terminals and a resistance to a vehicle vibration by using elastic stress generated from the elastic deformation, and thereby enhancing stability of high voltage power supply.

In addition, an example the present disclosure does not use bolts or springs to maintain a fastening force between the male connector and the female connector, thereby reducing a number of parts, reducing weight, and reducing costs.

Although examples of the present disclosure have been disclosed for illustrative purposes, those skilled in the art will appreciate that various modifications, additions, and substitutions are possible, without departing from the spirit and scope of the present disclosure.

What is claimed is:

1. A high voltage connector for a vehicle, the high voltage connector comprising:
    a male connector having a tube shape and comprising a truncated conical protuberance-shaped first terminal; and
    a female connector having a tube shape and comprising a second terminal that forms a truncated conical coupling groove corresponding to the first terminal,
    wherein the first terminal is configured to form an electrical connection between the male connector and the female connector when inserted into the coupling groove,
    wherein the male connector has a male connector groove having a closed first end and an open second end, the male connector groove forming an internal space of the male connector,
    wherein the first terminal, disposed in the male connector groove, protrudes from the closed first end toward the open second end,
    wherein the coupling groove forms an internal space, in the female connector, having a closed first end and an open second end, wherein a portion of the second terminal, disposed in a female connector groove of the female connector, protrudes from the closed first end of the coupling groove toward the open second end of the coupling groove, and
    wherein when the male connector and the female connector are coupled to each other, an open end of the male connector is inserted into the female connector groove.

2. The high voltage connector of claim 1, wherein the first terminal protrudes in a protruding direction from an inside closed end of the male connector toward an open end of the male connector, and wherein the first terminal has a cross-section that decreases gradually in diameter along the protruding direction.

3. The high voltage connector of claim 1, wherein the second terminal is configured to protrude from inside the female connector in a protruding direction towards an open end of the female connector; and
    wherein the coupling groove is configured to open toward the open end in an opening direction and to increase gradually in diameter along the opening direction.

4. The high voltage connector of claim 1, wherein the first terminal is configured to, when the male connector and the female connector are coupled to each other, have a thick part of the first terminal inserted into the coupling groove.

5. A high voltage connector for a vehicle, the high voltage connector comprising:
    a male connector having a truncated conical protuberance-shaped first terminal; and
    a female connector having a second terminal that forms a truncated conical coupling groove corresponding to the first terminal,
    wherein the first terminal is configured to form an electrical connection between the male connector and the female connector when inserted into the coupling groove,
    wherein a plurality of slits are formed in the second terminal such that the plurality of slits extend along a longitudinal direction of the second terminal and open toward an open end of the second terminal, wherein the plurality of slits are continuous with the coupling groove, and spaced apart from each other along a circumferential direction of the second terminal,
    wherein the second terminal comprises a plurality of elastically deformable pieces between the plurality of slits, and
    wherein an inclination angle of an outer surface of the first terminal is configured to be greater than an inclination angle of an inner circumferential surface of the coupling groove.

6. The high voltage connector of claim 5, wherein the elastically deformable pieces of the second terminal are configured to, when the first terminal is inserted into the coupling groove, be elastically deformed to open outwardly, such that:
    an elastic stress for shape restoration is generated by the elastic deformation, and
    the elastically deformable pieces press the outer surface of the first terminal, thereby generating a fastening force between the first terminal and the second terminal.

7. The high voltage connector of claim 1, wherein a plurality of slits are formed in the second terminal such that the plurality of slits extend along a longitudinal direction of the second terminal and open toward an open end of the second terminal, wherein the plurality of slits are continuous with the coupling groove, and spaced apart from each other along a circumferential direction of the second terminal, and wherein the second terminal comprises a plurality of elastically deformable pieces between the plurality of slits.

8. The high voltage connector of claim 7, wherein an inclination angle of an outer surface of the first terminal is configured to be greater than an inclination angle of an inner circumferential surface of the coupling groove.

9. The high voltage connector of claim 8, wherein the elastically deformable pieces of the second terminal are configured to, when the first terminal is inserted into the coupling groove, be elastically deformed to open outwardly by the inclination angle of the outer surface of the first terminal, such that:

an elastic stress for shape restoration is generated by the elastic deformation, and the elastically deformable pieces press the outer surface of the first terminal, thereby generating a fastening force between the first terminal and the second terminal.

10. The high voltage connector of claim 1, wherein the second terminal comprises a plurality of elastically deformable pieces between a plurality of slits formed in the second terminal, and wherein an inclination angle of an outer surface of the first terminal is configured to be greater than an inclination angle of an inner circumferential surface of the coupling groove.

\* \* \* \* \*